United States Patent
Taylor et al.

(10) Patent No.: US 7,792,410 B2
(45) Date of Patent: Sep. 7, 2010

(54) PLAYBACK DIAGNOSTICS

(75) Inventors: Thomas H. Taylor, Redmond, WA (US);
Peter J. Potrebic, Calistoga, CA (US);
Steven Horowitz, Los Altos, CA (US)

(73) Assignee: Microsoft Corporation, Redmond, WA (US)

( * ) Notice: Subject to any disclaimer, the term of this patent is extended or adjusted under 35 U.S.C. 154(b) by 486 days.

(21) Appl. No.: 11/876,460

(22) Filed: Oct. 22, 2007

(65) Prior Publication Data
US 2008/0040750 A1    Feb. 14, 2008

Related U.S. Application Data

(63) Continuation of application No. 10/144,087, filed on May 10, 2002, now Pat. No. 7,298,960.

(51) Int. Cl.
*H04N 5/76* (2006.01)
*H04N 7/00* (2006.01)

(52) U.S. Cl. .......................................... 386/46; 386/83
(58) Field of Classification Search .................... 386/1, 386/45–46, 83, 94–95, 125–126
See application file for complete search history.

(56) References Cited

U.S. PATENT DOCUMENTS

| | | | |
|---|---|---|---|
| 6,311,011 B1 * | 10/2001 | Kuroda | 386/46 |
| 6,738,559 B1 * | 5/2004 | Yoo et al. | 386/46 |
| 6,925,567 B1 | 8/2005 | Hirata | |
| 7,298,960 B1 | 11/2007 | Taylor et al. | |

* cited by examiner

*Primary Examiner*—Thai Tran
*Assistant Examiner*—Nigar Chowdhury

(57) ABSTRACT

A request is received to create a program event to record a program from a broadcast start time through a broadcast end time on a broadcast channel. The program event is created to record the program in a recording for a playback of the program from the recording. Upon an occurrence of an incident likely to prevent the play back, a diagnostic descriptive of the incident is output.

17 Claims, 6 Drawing Sheets

PLAYBACK DIAGNOSTICS

RELATED APPLICATIONS

This is a continuation of U.S. patent application Ser. No. 10/144,087 filed on May 10, 2002, entitled "Playback Diagnostics", listing Thomas H. Taylor, Peter J. Potrebic and Steve Horowitz as inventors, which is hereby incorporated by reference in its entirety.

TECHNICAL FIELD

The present invention relates to playing back a recording of a television program broadcast on a channel. More particularly, the present invention relates to providing diagnostics as to incidents likely to prevent a play back of the television program.

BACKGROUND

Client devices in a television-based entertainment system include set top boxes such as cable boxes, satellite receivers, video cassette recorders (VCRs), and digital video recorders (DVRs). Some client devices have recording capabilities and can be set-up to record a television (TV) program currently being broadcast. Typically, a client device is set-up to record a TV program ahead of time on a particular date at a certain starting time, on a particular broadcast channel, and for a particular duration. On the particular date, the client device tunes a tuner to the particular channel at the particular starting time and records the TV program being broadcast on the particular channel for the particular duration. After the recording of the TV program has been made, the recording can be played back for the enjoyment of a viewer. In the case of DVRs, the TV program doesn't have to finish recording before a viewer can start playing it back to watch it.

The general object of making a recording of a TV program is to be able to play back and thus enjoy the TV program at other than the broadcast time thereof. Various incidents can occur any one of which are likely to prevent such a play back, such as an incident that prevents the client device from recording the TV program. A viewer has an unpleasant experience with the client device when the desired recording is not made or when a recording that was made can not be played back. Moreover, the unpleasant nature of the experience is exacerbated for a viewer when the client device fails to provide an adequate explanation as to why the TV program could be neither recorded nor played back. It would be desirable to enhance viewer experience with a client device by informing the viewer of incidents likely to prevent the desired play back of the TV program. Consequently, there is a need for improved methods, client devices, digital video recorders, computer programs, and systems that can provide such a capability.

SUMMARY

Methods, client devices, digital video recorders, computer programs, and systems receive a request to create a program event to record a program from a broadcast start time through a broadcast end time on a broadcast channel. The program event is created to record the program in a recording for a playback of the program from the recording. Upon an occurrence of an incident likely to prevent the play back, a diagnostic descriptive of the incident is output.

In an implementation, a client device has a processor in communication with a video recorder and a receiver. The processor executes an application to receive a request to create a program event to record a program with the video recorder from a broadcast start time through a broadcast end time on a broadcast channel carrying a video signal. Execution of the application creates the program event. The program event coordinates the recording of the program in a recording. The video recorder, which has a component that is a video playback device, plays back the recorded broadcast of the program. When an incident occurs that is likely to prevent the program from being recorded or from playing back from a recording of the program, a diagnostic is output that describes the incident.

DETAILED DESCRIPTION

Figure 1:
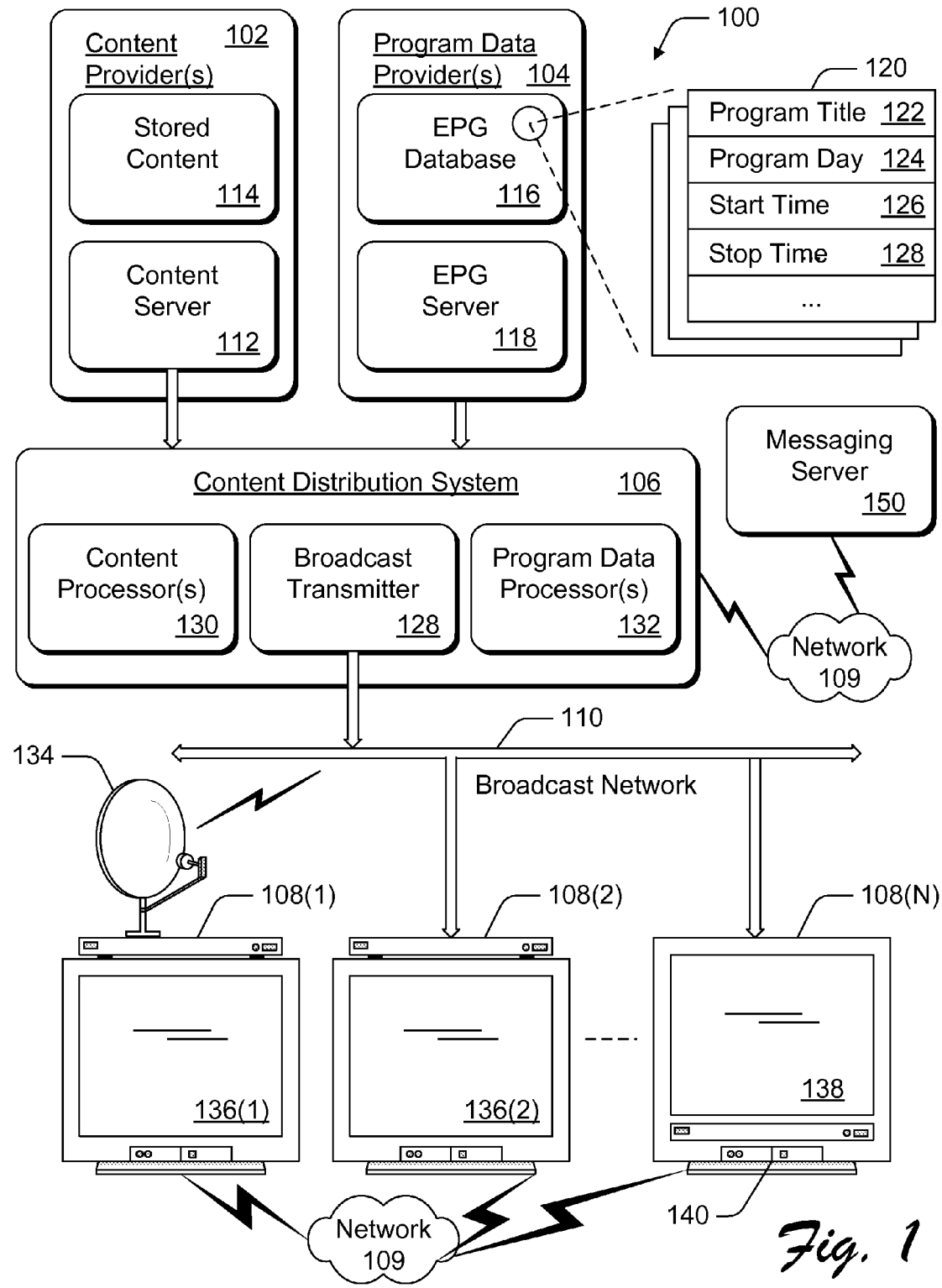
FIG. 1 illustrates an exemplary environment in which the methods, client devices, digital video recorders, computer programs, and systems described herein may be implemented.

An entertainment architecture has a television broadcasting system that includes a television broadcast network, a network resource, and a client device. In addition to the television broadcast network, the entertainment architecture can have a two-way interconnected network placing the network resource in communication with the client device. The television broadcast network broadcasts video signals on a plurality of channels. The network resource includes a content database storing content of a plurality of video broadcast events and a content serving module to serve the video broadcast events by broadcasting on the television broadcast network. Also included in the network resource is a guide database that stores event schedules each including one of the channels, a start time, and a duration corresponding to one of the video broadcast events on the broadcast network. A guide serving module is also included in the network resource to serve the event schedules by broadcasting on the television broadcast network.

The client device includes a receiver to receive a video signal and a video recorder to create a recording of video data received in the video signal into a storage area of a memory device. A video play is included in the client device to play back the recording of video data in the storage area of the memory device. A processor in the client device executes an application to perform various functions. These functions include receiving a request to create a program event for making a recording in the memory of one of the video broadcast events that is being broadcast on one of the channels, where the recording includes the content and the corresponding event schedule. Another function is the creation of the program event in response to the request.

Once the program event has been created, various incidents can occur that might prevent the video recorder from either making a recording of the video broadcast event or playing back the recording once the recording has been made. If the recording is not made, the video recorder will not be capable of playing back the recording. Thus, an incident that prevents the recording from being made is also an incident that prevents the video recorder from playing back the recording. A corrective event can be initiated following such an incident which, if timely performed, will allow the recording to be made or will allow a recording that has been made to be played back. Nevertheless, without the needed corrective event, the incident would likely prevent the recording from being made, and thus would likely prevent a play back of the recording.

Upon an occurrence of an incident that will likely prevent a play back by the video recorder of the recording in the memory corresponding to the program event, be it either a failure to make a recording or a failure to play back the recording once it has been made, execution of the application causes an output of a diagnostic that is descriptive of the incident that occurred. The incident can be one that is likely to prevent making the recording from being made, or one that is likely to prevent the recording, once made, from being played back. The requested program event is created in conjunction with a guide database which can be an electronic program guide (EPG). The EPG can be received into the memory of the client device by various techniques, including but not limited to directly tuning to a guide data stream on demand, a once-per-day dial up to receive EPG data, and trickle streaming the EPG data from a satellite signal or from another program guide data provider. The EPG typically includes information that relates to the programming content that will be broadcast in the future. More specifically, the guide data contains information that indicates, in advance, the starting time and ending time of the programs that are described by the guide data. The EPG also includes the channel, and the program title. A viewer selects a TV program listed in the EPG for recording by the client device. The client device is then able to create a program event that coordinates the client device to record the program that is linked in the EPG at its corresponding broadcast time.

The discussion herein is directed to television-based entertainment systems, such as interactive TV networks, cable networks and satellite systems that utilize electronic program guides, and Web-enabled TV networks. Client devices in such systems range from full-resource clients with substantial memory and processing resources, such as TV-enabled personal computers and TV recorders equipped with hard-disks, to low-resource clients with limited memory and/or processing resources, such as traditional set-top boxes. While aspects of the described methods and computer programs can be used in any of these systems and for any types of client devices, they are described in the context of the following exemplary environment.

Exemplary Environment

FIG. 1 illustrates an exemplary environment 100 in which the methods, client devices, digital video recorders, computer programs, and systems described herein may be implemented. Exemplary environment 100 is a television entertainment system that facilitates distribution of content and program data to multiple viewers. The environment 100 includes one or more content providers 102, one or more program data providers 104, a content distribution system 106, and multiple client devices 108(1), 108(2), . . . , 108(N) coupled to the content distribution system 106 via a broadcast network 110.

Content provider 102 includes a content server 112 and stored content 114, such as movies, television programs, commercials, music, and similar audio and/or video content. Content server 112 controls distribution of the stored content 114 from content provider 102 to the content distribution system 106. Additionally, content server 102 controls distribution of live content (e.g., content that was not previously stored, such as live feeds) and/or content stored at other locations to the content distribution system 106.

Program data provider 104 includes an electronic program guide (EPG) database 116 and an EPG server 118. The EPG database 116 stores electronic files of program data 120 which is used to generate an electronic program guide (or, "program guide"). Program data includes program titles, ratings, characters, descriptions, actor names, station identifiers, channel identifiers, schedule information, and so on. The terms "program data" and "EPG data" are used interchangeably throughout this discussion. For discussion purposes, an electronic file maintains program data 120 that may include a program title 122, a program day or days 124 to identify which days of the week the program will be shown, and a start time or times 126 to identify the time that the program will be shown on the particular day or days of the week.

The EPG server 118 processes the EPG data prior to distribution to generate a published version of the program data which contains programming information for all channels for one or more days. The processing may involve any number of techniques to reduce, modify, or enhance the EPG data. Such processes might include selection of content, content compression, format modification, and the like. The EPG server 118 controls distribution of the published version of the program data from program data provider 104 to the content distribution system 106 using, for example, a file transfer protocol (FTP) over a TCP/IP network (e.g., Internet, UNIX, etc.). Further, the published version of the program data can be transmitted from program data provider 102 via a satellite 134 directly to a client device 108 by use of a satellite dish 134. The EPG data need not be received via a video signal. Rather, the EPG data can be received by the client device by tuning to a low bandwidth carrier signal that piggybacks with other signals and is generally transmitted at a lower data rate than video signals that are transmitted by satellite.

Content distribution system 106 includes a broadcast transmitter 128, one or more content processors 130, and one or more program data processors 132. Broadcast transmitter 128 broadcasts signals, such as cable television signals, across broadcast network 110. Broadcast network 110 can include a cable television network, RF, microwave, satellite, and/or data network, such as the Internet, and may also include wired or wireless media using any broadcast format or broadcast protocol. Additionally, broadcast network 110 can be any type of network, using any type of network topology and any network communication protocol, and can be represented or otherwise implemented as a combination of two or more networks.

Content processor 130 processes the content received from content provider 102 prior to transmitting the content across broadcast network 108. Similarly, program data processor 132 processes the program data received from program data provider 104 prior to transmitting the program data across broadcast network 11 0. A particular content processor 130 may encode, or otherwise process, the received content into a format that is understood by the multiple client devices 108 (1), 108(2), . . . , 108(N) coupled to broadcast network 110. Although FIG. 1 shows a single content provider 102, a single program data provider 104, and a single content distribution system 106, exemplary environment 100 can include any number of content providers and/or program data providers coupled to any number of content distribution systems.

Content distribution system 106 is representative of a headend service that provides EPG data, as well as content, to multiple subscribers. Each content distribution system 104 may receive a slightly different version of the program data that takes into account different programming preferences and lineups. The EPG server 118 creates different versions of EPG data (e.g., different versions of a program guide) that include those channels of relevance to respective headend services, and the content distribution system 106 transmits the EPG data to the multiple client devices 108(1), 108(2), . . . , 108(N). In one implementation, for example, content distribution system 106 utilizes a carousel file system to repeatedly broadcast the EPG data over an out-of-band (OOB) channel to the client devices 108.

Client devices 108 can be implemented in a number of ways. For example, a client device 108(1) receives broadcast content from a satellite-based transmitter via satellite dish 134. Client device 108(1) is also referred to as a set-top box or a satellite receiving device. Client device 108(1) is coupled to a television 136(1) for presenting the content received by the client device (e.g., audio data and video data), as well as a graphical user interface. A particular client device 108 can be coupled to any number of televisions 136 and/or similar devices that can be implemented to display or otherwise render content. Similarly, any number of client devices 108 can be coupled to a single television 136.

Client device 108(2) is also coupled to receive broadcast content from broadcast network 110 and provide the received content to associated television 136(2). Client device 108(N) is an example of a combination television 138 and integrated set-top box 140. In this example, the various components and functionality of the set-top box are incorporated into the television, rather than using two separate devices. The set-top box incorporated into the television may receive broadcast signals via a satellite dish (similar to satellite dish 134) and/or via broadcast network 110. In alternate implementations, client devices 108 may receive broadcast signals via a two-way network, such as the Internet, or any other broadcast medium.

Each client device 108 runs an EPG application that utilizes the program data. The EPG application enables a television viewer to navigate through an onscreen program guide and locate television shows of interest to the viewer. With the EPG application, the television viewer can look at schedules of current and future programming, set reminders for upcoming programs, and/or enter instructions to record one or more television shows. The client device 108, in turn, creates one or more corresponding program events for the recordings.

Also included in environment 100 are one or more network devices, such as a messaging server 150, that communicate with content distribution system 106 and with client devices (1-N) through an interconnected network 109, such as the Internet. Interconnected network 109 allows two-way communication between client devices 108 (1-N) to messaging server 150. This communication allows client devices 108 (1-N) and/or messaging server 105 to transmit addressed messages over interconnected network 109. The addressed messages can be used to carry information that describes to a reader thereof the particular status of the functioning and/or operation of client devices 108 (1-N). Once such status of state, among others, might be a description of an incident that is likely to prevent a client device from recording TV programs and/or playing back recorded TV programs. A viewer can use the client device 108, or a personal computer or other network device to log on to network 109, such as the Internet, and to communicate with messaging server 150.

The messaging server 150 can be a network service, such as a Web hosting service, that stores data about any client device 108 or its respective viewer. The viewer can keep data at messaging server 150 that can in turn be accessed by other Web hosting services on the Internet where the viewer has permitted such access, which may be of a limited nature. An example of such a data provider is the Microsoft Network (MSN) of the Microsoft Corporation of Redmond, Wash. MSN provides a .NET™ PASSPORT® service that, among other services, stores data that can be retrieved by other Web services on the Internet that are compatible with the .NET™ PASSPORT® service. In this example, the viewer can submit various contact information to messaging server 150. These contact information can be one or more addresses to which diagnostics and/or descriptions of the diagnostics are to be sent with respect to recording and/or playing back a recording with a particular client device 108. When an incident occurs at a particular client device 108 with respect to making a recording of a TV program, or playing back a recording of a TV program, client device 108 can send a cryptic diagnostic to messaging server 150. Messaging server 150 can identify the particular client device by the content of the diagnostic, translate the cryptic diagnostic into a description of the incident and/or a solution thereof, and then transmit the description of the incident and/or solution to the one or more addresses that the viewer has stored at messaging server 150.

The process and circumstances under which messaging server 150 transmits descriptive diagnostics to the one or more addresses can be variously configured. For instance, messaging server 150 can be configured to transmit textual messages during daylight hours to a cellular telephone number and to transmit the same to a facsimile machine during evening hours. The configuration of a Web hosting service, such as messaging server 150, can be operated by the viewer from a two-way network resource having access to interconnected network 109, such as a personal computer or a local set top box client device. Of course, alternative configurations are contemplated as are conventional with message delivery modalities.

Optionally, one or more of the program data providers 104 can include stored on-demand content, such as Video On-Demand (VOD) movie content. The stored on-demand content can be viewed with a client device 108 through an onscreen movie guide, for example, and a viewer can enter instructions to stream a particular movie, or other stored content, down to a corresponding client device 108.

Exemplary Client Device

Figure 2:
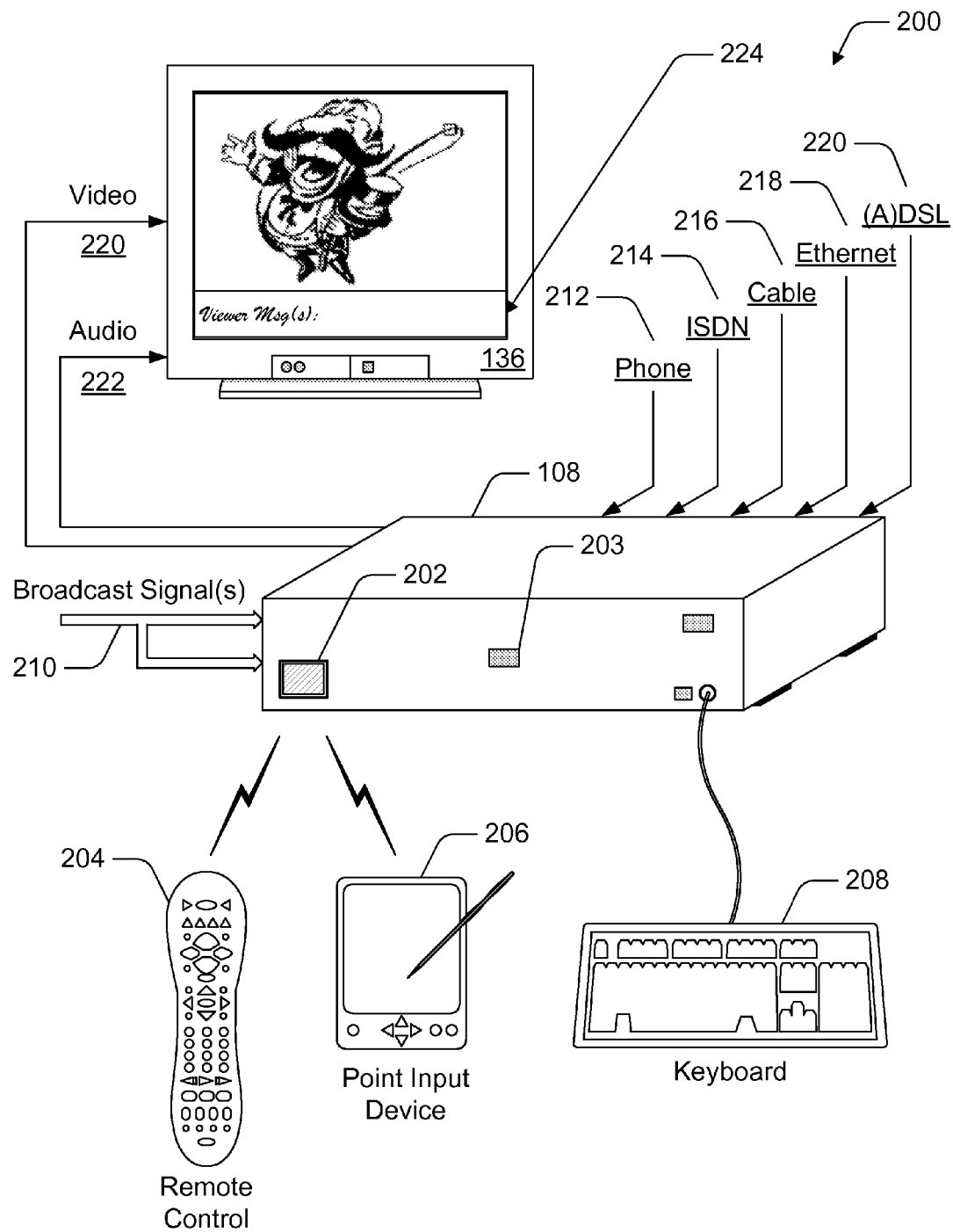
FIG. 2 illustrates of an example client device, a television, and various input devices that interact with the client device.

FIG. 2 illustrates an exemplary implementation 200 of a client device 108 shown as a standalone unit that connects to a television 136. Client device 108 can be implemented in any number of embodiments, including as a set-top box, a satellite receiver, a TV recorder with a hard disk, personal computer, a game console, an information appliance, and so forth. Client device 108 includes a wireless receiving port 202, such as an infrared (IR) or Bluetooth wireless port, for receiving wireless communications from a remote control device 204, a handheld input device 206, or any other wireless device, such as a wireless keyboard. Handheld input device 206 can be a personal digital assistant (PDA), handheld computer, wireless phone, or the like. Additionally, a wired keyboard 208 is coupled to communicate with the client device 108. In alternate embodiments, remote control device 204, handheld device 206, and/or keyboard 208 may use an RF communication link or other mode of transmission to communicate with client device 108.

Client device 108 receives one or more broadcast signals 210 through from one or more broadcast sources, such as from a satellite or from a broadcast network. Client device 108 includes hardware and/or software for receiving and decoding broadcast signal 210, such as an NTSC, PAL, SECAM or other TV system video signal. Client device 108 also includes hardware and/or software for providing the viewer with a graphical user interface by which the viewer can, for example, access various network services, configure the client device 108, and perform other functions.

Client device 108 is capable of communicating through interconnected network 109 seen in FIG. 1 with other devices via one or more connections including a conventional telephone link 212, an ISDN link 214, a cable link 216, an Ethernet link 218, an ADSL and/or DSL link 220, and the like. Client device 108 may use any one or more of the various communication links 212-220 at a particular instant to communicate with any number of other devices and/or to establish a two-way communication with one or more network resources.

Client device 108 generates video signal(s) 220 and audio signal(s) 222, both of which are communicated to television 136. The video signals and audio signals can be communicated from client device 108 to television 136 via an RF (radio frequency) link, S-video link, composite video link, component video link, or other communication link. At reference numeral 203 in FIG. 2, client device 108 includes one or more lights or other indicators identifying the current status of the device or for diagnostic reports to a viewer. Additionally, the client device may include one or more control buttons, switches, or other selectable controls for controlling operation of the device.

In FIG. 2, television 136 shows a display line 224 which informs the viewer that client device 108 has output a diagnostic. By way of example, a diagnostic can be output by client device 108 that describes an incident in communications with a two-way network, where client device 108 cannot send descriptive diagnostics to a predetermined network address. Such a failure can be due to excessive network traffic or a failure in logging onto the network. Other diagnostics and descriptions thereof that are output by client device 108 for display on television 136 are discussed below with respect to FIG. 6. The diagnostics can be issued to the viewer for their own edification and/or so that the viewer may take any action that may be warranted. Additionally, a diagnostic visual and/or audible alarm device or mechanism at reference numeral 203 can emit a diagnostic representative of that which is displayed at display line 224. In the alternative, both display line 224 and an alarm with the diagnostic visual and/or audible alarm device or mechanism at reference numeral 203 can be used so that the viewer may be warned visually and/or audibly.

Figure 3:
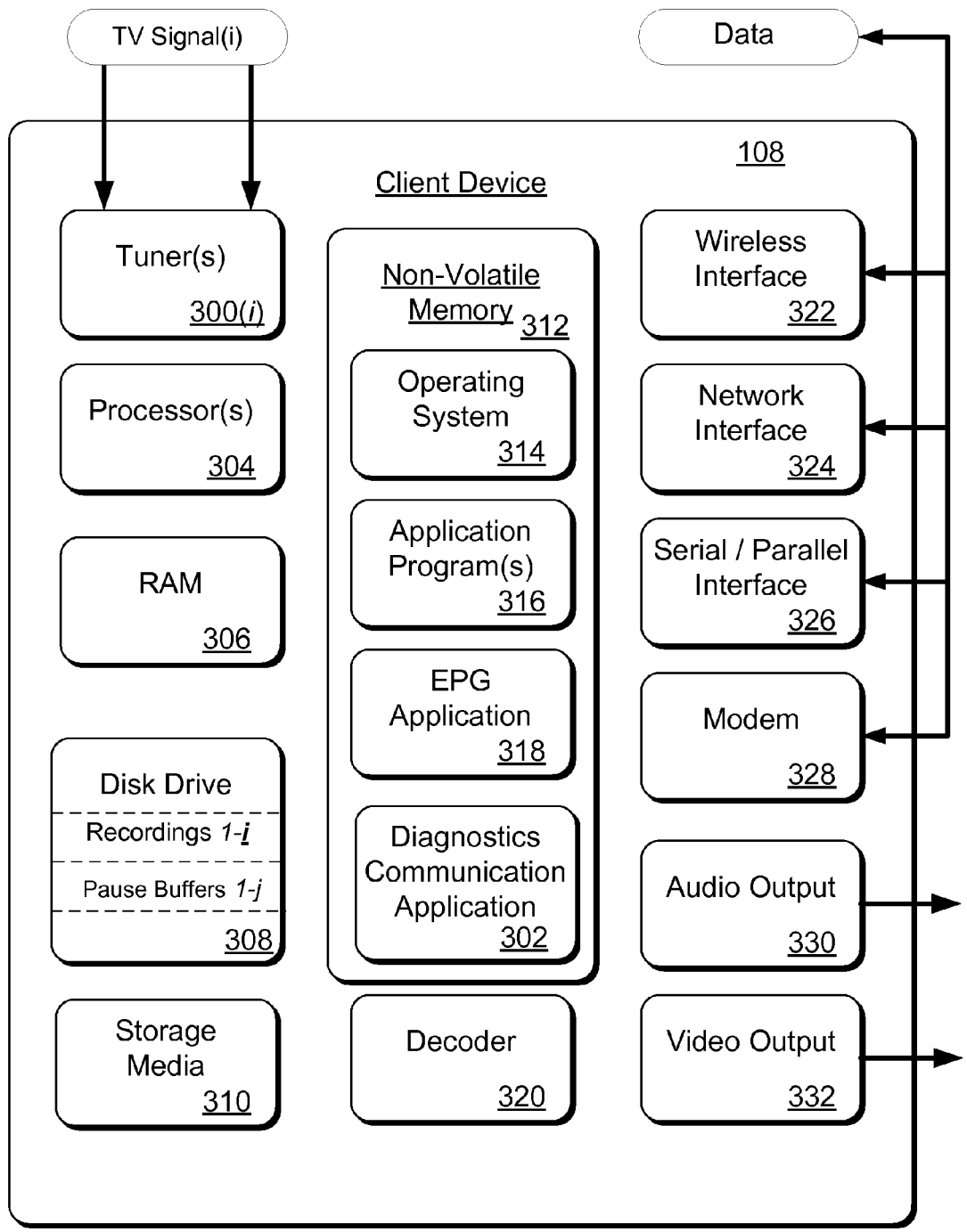
FIG. 3 is a block diagram that illustrates components of the example client device(s) shown in FIGS. 1-2.

FIG. 3 illustrates selected components of client device(s) 108 shown in FIGS. 1-2. Client device 108 includes one or more tuners 300(i). Tuners 300(i) are representative of one or more in-band tuners that tune to various frequencies or channels to receive television signals, as well as an out-of-band tuner that tunes to the broadcast channel over which the EPG data is broadcast to client device 108.

Client device 108 also includes one or more processors 304 and one or more memory components. Examples of possible memory components include a random access memory (RAM) 306, a disk drive 308, a mass storage component 310, and a non-volatile memory 312 (e.g., ROM, Flash, EPROM, EEPROM, etc.). Disk drive 308 can have one or a plurality of recordings (i) and one or a plurality of pause buffers (j) stored thereon. Recordings (i) and pause buffers (j) can also be stored in one or more other memory devices at client device 108, such as in non-volatile memory 312, RAM 306, and/or storage media 310. Alternatively, recordings (i) and pause buffers (j) can also be stored remote from client device 108 at a network resource in communication with client device 108 through interconnected network 109 seen in FIG. 1.

Alternative implementations of client device 108 can include a range of processing and memory capabilities, and may include more or fewer types of memory components than those illustrated in FIG. 3. For example, full-resource clients can be implemented with substantial memory and processing resources, including a disk drive 308 to store content for replay by the viewer. Low-resource clients, however, may have limited processing and memory capabilities, such as a limited amount of RAM 306, no disk drive 308, and limited processing capabilities. Nevertheless it is intended that client device 108 include a capability for video recording, either locally or remotely from client device 108.

Processor(s) 304 process various instructions to control the operation of client device 108 and to communicate with other electronic and computing devices. The memory components (e.g., RAM 306, disk drive 308, storage media 310, and non-volatile memory 312) can be used to store various information and/or data such as recordings of TV programs or other broadcast content, EPG data, configuration information for client device 108, and/or graphical user interface information.

An operating system 314 and one or more application programs 316 may be stored in non-volatile memory 312 and executed on processor 304 to provide a runtime environment. A runtime environment facilitates extensibility of client device 108 by allowing various interfaces to be defined that, in turn, allow application programs 316 to interact with client device 108. In the illustrated example, an EPG application 318 is stored in memory 312 to operate on the EPG data and generate a program guide.

FIG. 3 shows non-volatile memory 312 having a diagnostics communication application 302 which, when executed by processor(s) 304, causes client device 108 to output a diagnostic. The diagnostic is output when particular incidents are detected to have occurred. For instance, client device 108 may detect an incident that, if uncorrected, will prevent a recording of a broadcast TV show from being made. It follows, therefore, that if the recording is not made due to the incident, then the incident also prevents a play back of the TV show, unless corrective action is taken. Thus, the execution of diagnostic application 302 causes client device 108 to output a diagnostic upon an occurrence of an incident likely to prevent a play back of a recording that was made or that was sought to be made by client device 108. A description of the particular diagnostic, and any remedy or correction thereto, can be stored in memory 312 and accessed in a variety of techniques, such as by a lookup table technique where a description corresponding to the particular diagnostic is found in the lookup table. The diagnostic output from client device 108, as well as other communications, can be communicated in a one or two-way communication through interconnected network 109 see in FIG. 1. These communications can be made with various network resources using network interface 324, wireless interface 322, serial/parallel interface 326, modem 328, or other well known communication hardware/software algorithms and protocol for computing devices. The application programs 316 that may be implemented at client device 108, which can function with a diagnostics communication application 302, include a browser to browse the Web so as to view diagnostics at a Web site, an electronic mail (email) program to facilitate email to transmit descriptive diagnostic emails to an email address, a facsimile transmission program to initiate a facsimile transmission to a facsimile machine through phone line 212 seen in FIG. 2 so as to send a facsimile message describing diagnostics with respect to client device 108, a Short Message Service (SMS) transmission program to initiate a transmission of a text message describing diagnostics with respect to client device 108 to a mobile pager on a page channel, and so on.

Client device 108 can also include other components pertaining to a television entertainment system which are not illustrated in this example for simplicity purposes. For instance, client device 108 can include a user interface application and user interface lights, buttons, controls, etc. to facilitate viewer interaction with the device.

Client device 108 also includes a decoder 320 to decode a broadcast video signal, such as an NTSC, PAL, SECAM or other TV system video signal. Alternatively, a decoder for client device 108 can be implemented, in whole or in part, as a software application executed by processor(s) 304. Wireless interface 322 allows client device 108 to receive input commands and other information from a viewer-operated input device, such as from a remote control device or from another IR, Bluetooth, or similar RF input device.

Network interface 324 and serial and/or parallel interface 326 allows client device 108 to interact and communicate with other electronic and computing devices via various communication links. Although not shown, client device 108 may also include other types of data communication interfaces to communicate with other devices. Modem 328 facilitates client device 108 communications with other electronic and computing devices via a conventional telephone line. Components seen at reference numerals 316 and 322-328 facilitate applications where client device 108 has Internet access or communicates data on a two-way network.

Client device 108 also includes an audio output 330 and a video output 332 that provide signals to a television or other device that processes and/or presents or otherwise renders the audio and video data. Although shown separately, some of the components of client device 108 may be implemented in an application specific integrated circuit (ASIC). Additionally, a system bus (not shown) typically connects the various components within client device 108. A system bus can be implemented as one or more of any of several types of bus structures, including a memory bus or memory controller, a peripheral bus, an accelerated graphics port, or a local bus using any of a variety of bus architectures. By way of example, such architectures can include an Industry Standard Architecture (ISA) bus, a Micro Channel Architecture (MCA) bus, an Enhanced ISA (EISA) bus, a Video Electronics Standards Association (VESA) local bus, and a Peripheral Component Interconnects (PCI) bus also known as a Mezzanine bus.

General reference has been made herein to one or more client devices, such as client device 108. As used herein, "client device" means any electronic device having data communications, data storage capabilities, and/or functions to process and record signals, such as broadcast signals, received from any of a number of different sources.

Figure 4:
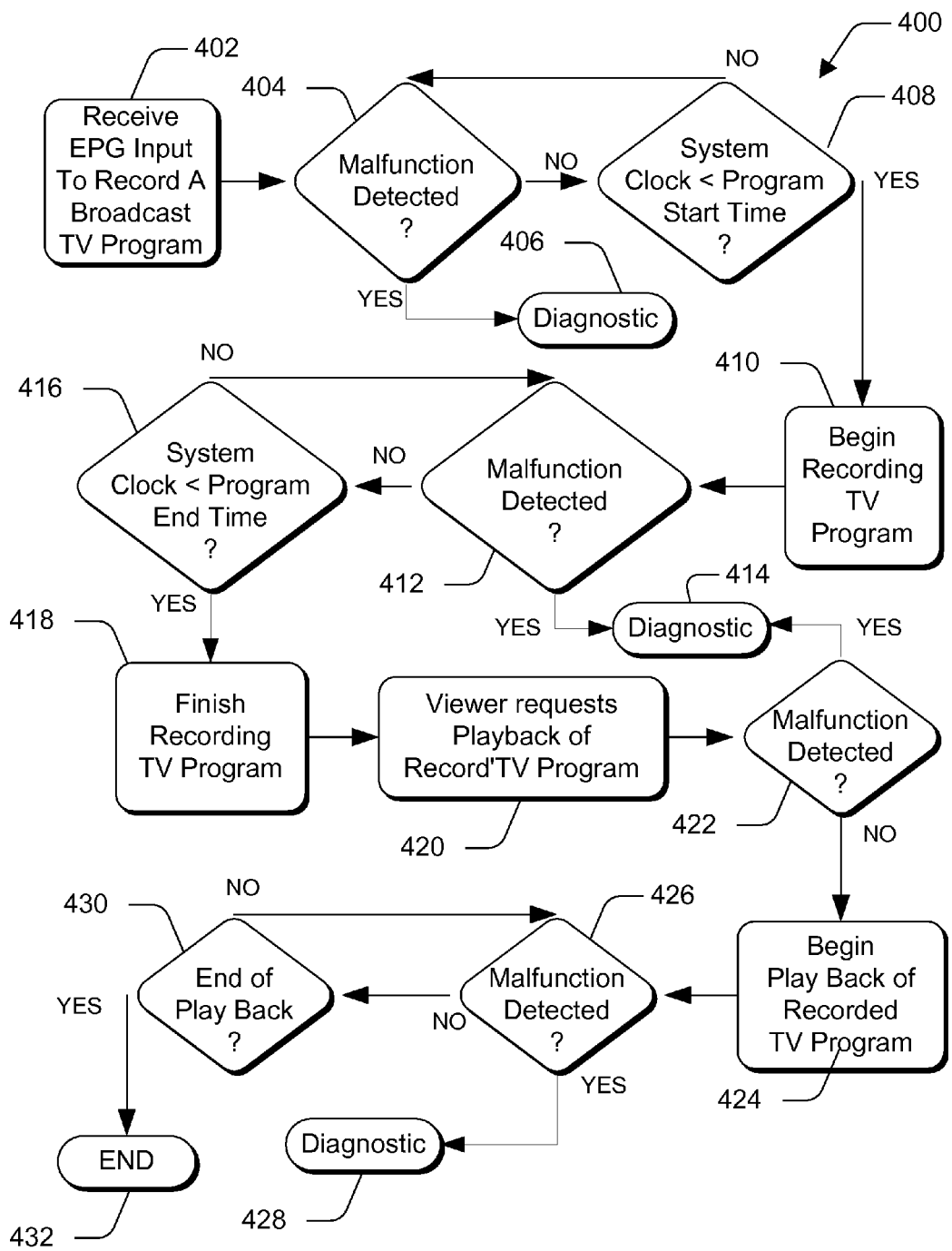
FIG. 4 is a flow diagram that illustrates a procedure for outputting a diagnostic descriptive of an incident that is likely to prevent a recording of a TV program or a play back of the recording.

FIG. 4 shows a method for programming a client device to create a program event so as to record a TV program that is to be broadcast at a broadcast time. The method in this implementation includes recording the TV program at the broadcast time, and playing back the recording TV program, where incidents are detected in the method so as to produce diagnostics therefrom. By way of example, and not by way of limitation, an incident can be an event that is likely to prevent a client device from making or playing back a recording. The order in which the method is described is not intended to be construed as a limitation, and any number of the described method blocks can be combined in any order to implement the method. Furthermore, the method can be implemented in any suitable hardware, software, firmware, or combination thereof.

A process 400 is seen in FIG. 4 which can be used, for example, with respect to environments 100, 200 depicted, respectively, in FIGS. 1-2. Process 400 proceeds at block 402 where a client device has received a request to record a TV program according to EPG data that assigns to the TV program a broadcast channel at a future starting time on a particular date for a particular duration. Process 400 then moves to block 404 where the client device tests for an incident. If an incident is detected by the client device, process 400 moves to block 406 where the client device outputs a diagnostic descriptive of the detected incident. If no incident is detected by the client device, process 400 moves to block 408 where a clock, such as a system clock of the client device, tests whether the date and time of the TV program to be recorded has arrived. The time can be obtained from the broadcast received by the client device, by input from the viewer that is made to the client device, or by other knows means. If the date and starting time of the TV program has not yet arrived, the process 400 cycles through blocks 408 and 404 until the date and starting time have arrived.

In one implementation, process 400 continues to loop between blocks 406 and 404 to repeatedly test whether the previously detected incident no longer exists. If the incident no longer can be detected at block 404, process 400 moves to block 406 where the client device outputs yet another diagnostic that describes that the previously detected incident can no longer be detected. Then, process 400 moves to block 408. By way of example, and not by way of limitation, a viewer schedules a favored TV program for recording according to a first set of EPG data received by a client device. Later, the client device receives a second set of EPG data that shows the TV program to be have been preempted by an another TV program. A first diagnostic is output by the client device describing the preempting incident that will likely prevent the desired recording, and therefore play back, of the viewer favored TV program. The client device then receives a third set of EPG data that removes the preempting program and re-schedules the viewer favored TV program as per its original broadcast schedule. A second diagnostic is then output by the client device describing the removal of the incident and acknowledging that the original program will be recorded as originally scheduled.

At the time of the broadcast of the TV program, in accordance with the corresponding EPG data, the client device begins recording the TV program on a corresponding broadcast channel at block 410. During the recording through the duration of the broadcast, the client device tests for an incident at respective blocks 412 and 416. A description of any detected incident is output at block 414 and process 400 can abort.

In one implementation, process 400 can continue loop from block 414 to block 412 to test whether the incident no longer exists, as was described above. When the incident can no longer be detected, process 400 proceeds to block 416 to complete the recording of the TV program in accordance with the corresponding EPG data.

After the recording of the TV program in accordance with the corresponding EPG data, the recording process is completed at block 418. Subsequently, at block 420, a viewer inputs a command to the client device to request a play back of the TV program recorded by the client device. Before playing back the recorded TV program, the client device tests for an incident at block 422 and reports a diagnostic that is descriptive of any detected incidents at block 414. Otherwise, the play back begins at block 424 and is completed at block 432. Between the beginning and end of the play back of the recorded TV program, the client device tests for an incident at block 426 and outputs a description of the incident at block 428. Process 400 shows that descriptive diagnostics of incidents can be output by a client device when there is an unsuccessful creation of a recording of a TV program or when there is an unsuccessful playback of the recording.

The techniques, methods, or algorithms in and by which the client device makes a descriptive report of a detected incident at blocks 406, 414, and 426 in process 400 are sufficient to communicate the context of the respective incident to a viewer or other interested party with respective to when the incident is likely to prevent a TV program from being recorded or when the incident is likely to prevent a TV program that was recorded from being played back. The incident detected by the client device can include, but is not limited to, a video signal failure on the broadcast channel, an equipment failure at the client device, and a receipt of notice at the client device that the broadcast of the TV program on the channel has in someway changed from the original data used to program the client device to perform the recording. By way of example of the later incident, a viewer first schedules a favored TV program for recording according to a first set of EPG data received by a client device. Later, the client device receives a second set of EPG data that shows the TV program to be have been preempted by an another TV program. A video signal failure on the broadcast channel incident can occur before a completion of making the recording of the TV program and before a completion of the playback of the same. Examples of a video signal failure include incidents where a cable that carries the video signal to the client device becomes unattached from the client device, or where the client device detects that the video signal is scrambled. The signal may become scrambled because the client device losses rights to view content on a particular channel to due a lapsed subscription to the channel to which access was conditioned upon a paid-up subscription. An equipment failure incident can occur before a completion of making the recording and before a completion of the playback thereof.

The client device can be a standalone device that outputs diagnostics to a TV receiver. Alternatively, the client device can be in communication with other peripheral devices and/or with one or more network resources through an interconnected network. As such, the client device can output a diagnostic in various techniques, methods, or algorithms including, but not limited to, an audio output, a visual output, and by way of a transmission to an address on the interconnected network. In the case of the transmission, the transmission can include a message containing a diagnostic that describes the incident. The transmission of the message to the address can take several different actions including, but not limited to, transmitting the message for output at a printer having the address, transmitting the message for output on a television receiver having the address, transmitting the message for a facsimile transmission on a circuit switched network to a facsimile machine associated with a facsimile telephone number corresponding to the address, transmitting the message for a circuit switched network in a telephone transmission to a telephone number corresponding to the address, transmitting the message for a packet switched network to a network resource having the address as a publication to a Web site hosted by the network resource, transmitting the message in packets for a packet switched network to a network resource having the address, transmitting the message as email to an email address at an email server serving the address, and transmitting the message for an SMS transmission to a mobile pager on a page channel.

The message in the transmission can include not only a description of the incident, but also a description of one or more solutions or corrective actions that, if taken, will likely permit the intended TV program to be recorded and/or a recording thereof played back. The descriptive diagnostics can be output by the client device in a function that, for each incident, writes an entry to a history file for the TV program. The client device can then optionally output all or a portion of the history file. In addition to the incident, the client device can also be configured to output descriptions of each action taken with respect to recording and playing back a TV program, both the successful actions as well as the incidents. As such, a complete history log and/or file can be established for each TV program to be recorded and for each recorded TV program to be played back by the client device.

In general, an incident can occur within different time periods with respect to making a recording of a TV program and/or a play back of the recording of the TV program. An incident can occur before the recording in the time period prior to the broadcast start time of the TV program. During the recording, an incident can occur from about the broadcast start time to about the broadcast end time. An incident can also occur after the recording is made but prior to a completion of the play back of the recording of the TV program. Various incidents can occur prior to the broadcast start time of the TV program that will likely prevent a proper recording, and therefore a proper playback, of the TV program. One such incident is a change in the corresponding EPG data that invalidates the original EPG data used to program the client device. A revision to the EPG data that is received by the client device can detect such an incident when compared to prior viewer requests for recordings. Possible EPG data changes include the broadcast start time, the broadcast end time, and the broadcast channel. Other incidents are a video signal failure on the broadcast channel, failure in equipment for processing the video signal in the client device, unavailability of memory in the client device to record the TV program, and a re-programming of the client device that changes the original instructions to record the TV program. Still another incident that can be output in a diagnostic by the client is where a viewer is notified when a TV program that is normally broadcast at a predetermined time is pre-empted by a different TV program. By way of example, and not by way of limitation, a circular four week recording history is associated with each series that a viewer wants to record. For the normal show time of each series, the viewer setups the client device with the appropriate recording event on. The client device is configured to maintain a history of the days the shows of each series were broadcast and the days the shows of the series were not broadcast. The client device can then use the statistical data of the history of broadcasts to output diagnostics that notify the user when a show in a series has been pre-empted. By way of a more particular example, a situation comedy show is normally scheduled to air every week for three consecutive Thursdays. On the fourth Thursday, the situation comedy is preempted by another show that is to be broadcast. The client can output a diagnostic, such as by writing a message entry to a history file, such as "The Situation Comedy on Channel 4 on Apr. 12, 2010 at 8:00 P.M. will not be recorded because it has been pre-empted by the Situation Drama."

The client device can determine, prior to the program starting time, that it lacks available memory to record a requested TV program. The client device may be configured to determine that the recording request has a higher priority than that of a previous recording request, and that memory is not available to record both programs. As such, the client device can remove the first programming request in favor of the second programming request, and then output a diagnostic that reflects that the client device has perfected a removal of the first programming request in favor of the second programming event. Alternatively, the client device may simply output the diagnostic. The viewer, upon receipt of the descriptive diagnostic, can then take remedial action with the client device such as by deleting the first request in favor of the second recording request.

While the client device is recording a TV program that is being broadcast on a channel of a broadcast network, various incidents can occur that will likely prevent a proper recording, and therefore a proper playback, of the TV program. This can include a change in at least one of the broadcast start time, the broadcast end time, and the broadcast channel, a video signal failure on the broadcast channel, a failure in equipment for processing the video signal or in the client device in general, unavailability of memory to record the TV program in the memory of the client device, a logical deletion of the recording that is being made or other memory failure, or a re-programming of the client device that changes the original instructions to record the TV program.

An incident can occur during the recording of a TV program where the client device determines that is lacks sufficient memory capacity to record the TV program. This can occur when the client device receives input that requests that the client device record another program. The client device then processes the request and may be configured to determine that the new programming request has a higher priority than that of the TV program that is currently being recorded. The unavailability of memory for both TV programs is detected by the client device, which in turn can logically delete the recording corresponding to the first TV program so as to secure memory sufficient to record the second TV program. Also, the client device can then output a report descriptive of its actions and causes thereof. Alternatively, the client device may simply output the diagnostic. The viewer, upon receipt of the descriptive diagnostic, can then take remedial action with the client device.

After a TV program has been recorded by a client device, incidents can occur that make a playback of the recorded TV program unlikely. Such incidents include failure in a playback component of the client device or other equipment required for same, or a logical deletion of the recorded TV program. Such a logical deletion can be made where the client device receives a request to create another TV program event from EPG data so as to record a corresponding TV program. The client device can be configured so as to detect both that the second TV program has a higher priority than that of the first TV program and that available memory in the client device that already holds a recording of the first TV program is insufficient to also record the second TV program. The client device can be configured to logically delete the recording corresponding to the first TV program so as to secure memory sufficient to recording the corresponding second TV program. Also, the client device can then output a report descriptive of its actions and causes thereof. Alternatively, the client device may simple output the diagnostic. The viewer, upon receipt of the descriptive diagnostic, can then take remedial action with the client device.

In general, the client device can be configured to logically erase all or at least a portion of a memory of the client device that is required to record a TV program that corresponds to EPG data indicated by a viewer by input to the client device. The logical erasure of the memory of the client device, however, may still not be sufficient to allow the TV program to be recorded. In this case, the client device can be configured to output a diagnostic descriptive of this problem. The viewer, upon receipt of the descriptive diagnostic, can then take remedial action with the client device.

Figure 5:
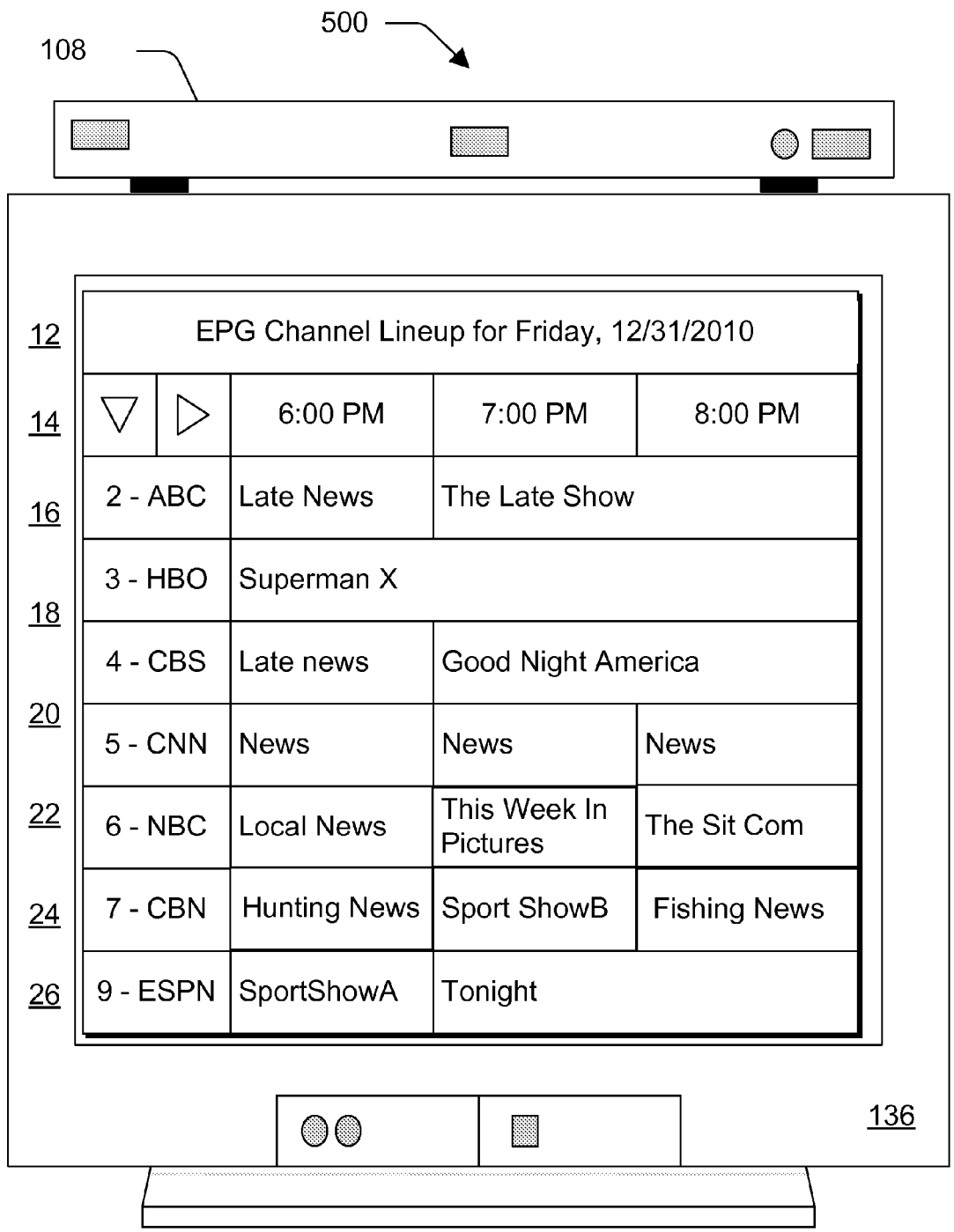
FIG. 5 illustrates, in a front elevation view, an exemplary environment in which a client device outputs a section of an electronic program guide (EPG) resulting in a display of same upon a television.

With reference to FIG. 5, an exemplary system 500 for implementing entertainment architecture includes client device 108 in communication with television 136. Television 136 has display lines 12 through 26 where there is displayed an example of a program guide showing part of a channel programming lineup for Friday, December 31, 2010. The program guide is generated with an EPG application in client device 108 with program data, where part of the program data is displayed on television 136. The program guide provides a viewer with a program title, the associated local channel number and/or television broadcasting company that will broadcast the program, and a time of the day that the program will be broadcast.

The program guide assists a viewer to identify and select a program title that the viewer wishes to view or record if the program is currently being broadcast, access program data to learn more about the program, and/or enter a request to record the program if the program is to air in the future. A viewer can move within the program guide, using an input device such as a remote control device, to input control commands to client device 108.

In display line 12, an explanation for the display on television 136 is given that the display shows a portion of the EPG channel lineup for the date Friday, Dec. 31, 2010. Display line 14, in the first column thereof, shows scrollable user interface icons. The first icon in the first column of display line 14 indicates that a viewer can scroll vertically to show various channels for the 6:00 P.M. to 9:00 P.M. time period. The second icon in the second column of display line 14 indicates that the viewer can scan chronologically forward and backwards for each of the displayed channels 2 through 9. The second, third and fourth columns indicate the timeslots 6 P.M., 7 P.M., and 8 P.M.

Display line 16 shows the lineup for channel 2, the "ABC" television broadcast network. As seen in the second column of display line 16 two programs are indicated, namely the Late News at 6 P.M. and the Late Show at 7 P.M. Display line 17 shows the lineup for channel 3, the "HBO" television broadcast network to be a TV program titled "Superman X" that starts at 6:00 PM and continues to 9:00 PM. Display line 24 for the display on television 136 shows the channel 7 line up for the CBN network. The line up includes several chronologically adjacent TV programs to be broadcast on Channel 7, including the Hunting News to begin at 6:00 P.M. and to continue until 7:00 P.M., the Sport Show B to begin at 7:00 P.M. and to continue until 8:00 P.M., and the Fishing News to begin at 8:00 P.M. Display line 26 shows that Sport Show A begins at 6 P.M. and continues until 7 P.M. on channel 9 on the ESPN television broadcast network. A viewer can use an input device, such as those seen at reference numerals 204-208 in FIG. 2, to select one or more of the TV program of the EPG seen in FIG. 5 to be recorded.

Figure 6:
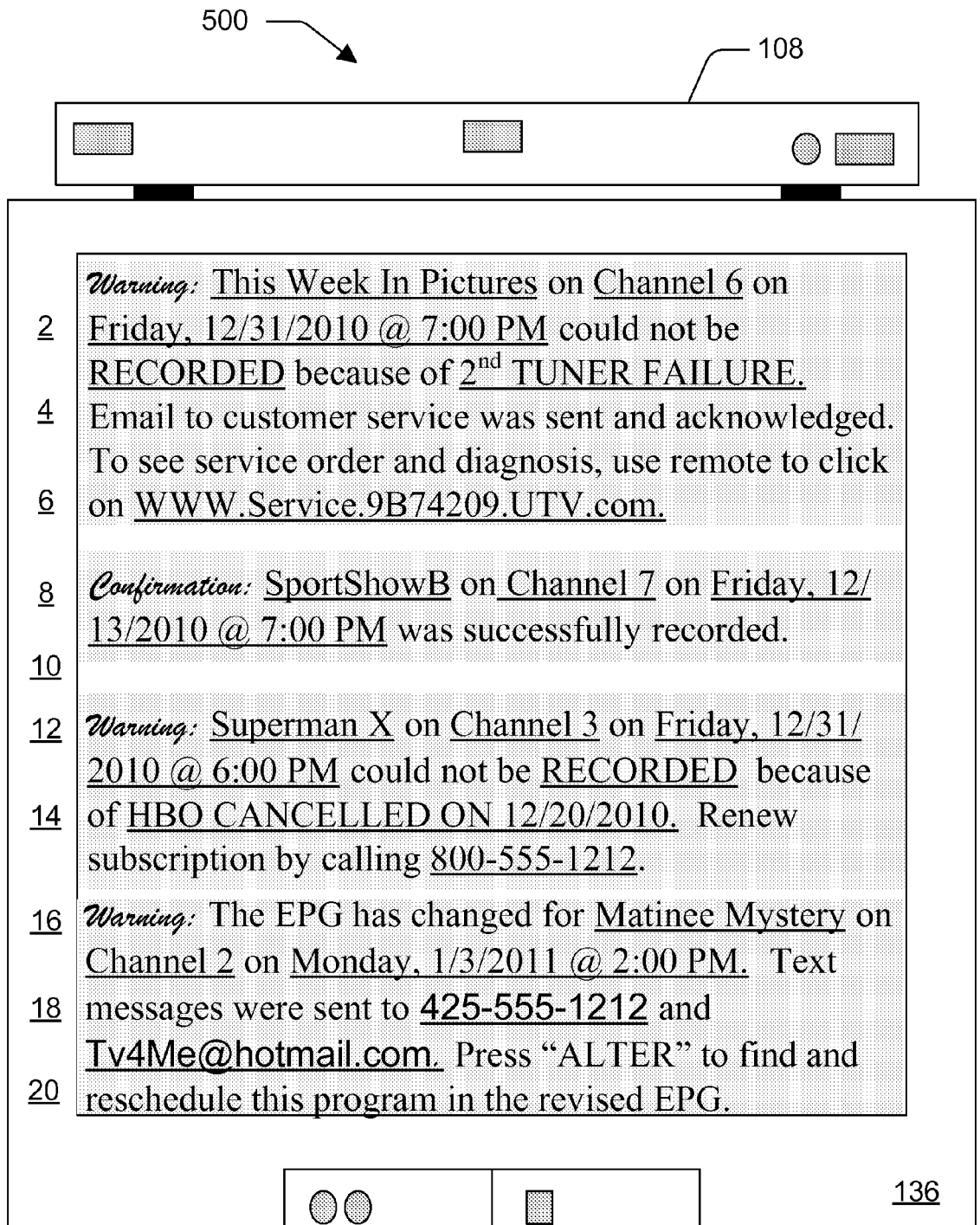
FIG. 6 shows the client device outputting diagnostics resulting in a display of same upon the television of FIG. 5.

With reference to FIG. 6, the exemplary system 500 shows television 136 having a display in display lines 2 through 20 where various diagnostics have been output by client device 108 for display on television 136 to be observed by a viewer. As such, the method of communication of descriptive diagnostics to the viewer, with respect to FIG. 6, is by display on television 136. Four (4) diagnostics are seen in FIG. 6. The first diagnostic is seen in FIG. 6 at display lines 2 through 6 and is indicative of a circumstance where a viewer has requested that "This Week In Pictures" be recorded on Channel 6 on Friday, Dec. 31, 2010 at 7:00 PM. The client device has output the diagnostic that its second tuner has malfunctioned by which the TV program on Channel 6 was to have been recorded. This diagnostic might be output by the client device where there were multiple tuners each of was busy recording another program. The desired recording might have been made, however, if another tuner was available.

The client device, however, has initiated remedial action by sending an email to a customer service organization, the receipt of which has been acknowledged by the same. The client device has also displayed a Web site address at which more information as to the diagnosis can be found. In this case, a Web browser function of the client device can be actuated to view the diagnosis at the Web site, such as by using an input device to input a demand to link to the displayed Web site. In addition to Web site addresses, the client device can be configured to store telephone numbers, email addresses, and other addresses to which the client device can send diagnostics and/or descriptions of such diagnostics.

Display lines 8-9 confirm that that the client device has successfully recorded Sport Show B on Channel 7 on Friday, Dec. 31, 2010 at 7:00 PM. Display lines 12-15 indicates that Superman X was to be recorded, but that the viewer has cancelled a subscription to the HBO programming on Channel 3, effective Dec. 20, 2010. These display lines also give a telephone number to call in order to initiate a resumption of the HBO subscription.

EPG data has been changed from the viewer's original programming instructions to the client device, as seen in display lines 16-20. In particular, the Matinee Mystery, originally scheduled to broadcast on Channel 2 at 2:00 PM on Monday, Jan. 3, 2010, has been taken off the broadcast lineup. The client device has output a description to the viewer with respect to using an input device to find out when Matinee Mystery will be broadcast. Here, the input device has a key titled "ALTER" that the viewer can press to initial this function of the client device. Apparent from display lines 16-20 is that the original EPG data has been revised. The revised EPG may have received by the client device from the broadcast network, or from another source such as from a two-way network, from the viewer making an input to the client device, and/or from other sources.

Implementations extend to methods, client devices, digital video recorders, computer programs, and systems for outputting a diagnostic descriptive of an incident that is likely to prevent a recording of a TV program or a play back of the recording. The implementations may comprise a special purpose or general purpose computer including various computer hardware as discussed by way of example in greater detail above. Implementations also include computer-readable media for carrying or having computer-executable instructions or data structures stored thereon. Such computer-readable media can be any available media which can be accessed by a general purpose or special purpose computer. One example of a special purpose computer is a set top box. By way of example, and not limitation, such computer-readable media can comprise RAM, ROM, EEPROM, CD-ROM, DVD-R or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such a connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The Figures and the foregoing discussion are intended to provide a brief, general description of a suitable computing environment in which the invention may be implemented. Although not required, the invention has been described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represent examples of corresponding acts for implementing the functions described in such steps.

Those skilled in the art will appreciate that the invention may be practiced in network computing environments with many types of computer system configurations, including set top boxes, personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method implemented by one or more components of a television client device comprising:
   receiving instructions to create a program event to record a media program at a scheduled time;
   creating the program event to record the media program;
   between successfully creating the program event and the scheduled time, detecting an intervening incident that causes a failure to record the media program;
   upon detecting the intervening incident, outputting a diagnostic descriptive of the intervening incident to explain the failure to record the media program to a viewer including at least storing the diagnostic descriptive in a history log accessible via a television user interface program having an electronic program guide (EPG) that is used to create the program event; and displaying the history log having the diagnostic descriptive through the television user interface program responsive to input received via the television user interface program to enable the viewer to view the history log.

2. The method as defined in claim 1, wherein the intervening incident that causes a failure to record the media program comprises a preemption of the media program and the diagnostic descriptive is output to explain the preemption.

3. The method as defined in claim 1, wherein the intervening incident that causes a failure to record the media program comprises a conflict with another program event having a priority higher than a priority of the program event to record the media program and the diagnostic descriptive is output to explain the conflict.

4. The method as defined in claim 1, wherein outputting the diagnostic descriptive of the intervening incident further comprises:
   forming a message including the diagnostic descriptive; and
   communicating the message including the diagnostic descriptive to one or more network devices associated with the viewer through an interconnected network.

5. The method as defined in claim 1 further comprising:
   executing the television user interface program at the television client device;
   providing an alert message via the television user interface program executed at the television client device indicating that the diagnostic descriptive is stored in the history log; and
   receiving the input through interaction of the viewer with the television user interface program to cause the display of the history log.

6. The method as defined in claim 1, wherein the diagnostic descriptive further describes one or more corrective actions for the viewer to undertake to resolve the intervening incident and permit recording of the media program at the scheduled time.

7. One or more computer-readable storage devices storing computer-executable instructions that, when executed, direct a television client to perform acts comprising:
   scheduling a recording of a television program responsive to receiving input from a viewer to initiate the recording;
   between scheduling the recording and performance of the recording, monitoring electronic program guide (EPG) data to detect a change that will cause a failure of the recording as scheduled;
   responsive to detecting the change in the EPG data, creating a diagnostic descriptive of the change to explain the failure of the recording to the viewer;
   logging the diagnostic descriptive in a history log accessible via a television user interface program having an electronic program guide (EPG); and
   providing access to the history log via the television user interface program to enable a viewer to view the diagnostic descriptive.

8. One or more computer-readable storage devices as defined in claim 7, wherein the change that will cause a failure of the recording as scheduled comprises a preemption of the television program and the diagnostic descriptive is created to explain the preemption.

9. One or more computer-readable storage devices as defined in claim 7, wherein the change that will cause a failure of the recording as scheduled comprises a change in the authorization of the television client to receive the television program.

10. One or more computer-readable storage devices as defined in claim 1, further comprising instructions to output a message for display on a display device via the television client to alert the viewer that the diagnostic descriptive has been created and stored in the history log.

11. One or more computer-readable storage devices as defined in claim 10, wherein the viewer navigates the television user interface program output at the television client to:
    initiate the recording; and
    view the diagnostic descriptive from the history log.

12. A method implemented by one or more components of a television computing system comprising:
    receiving a request to create a program event to cause a recording of a broadcast program at a scheduled time;
    creating the program event to record the broadcast program;
    responsive to detecting an incident that unless resolved will prevent the recording at the scheduled time, outputting a diagnostic descriptive to explain the incident to a viewer and describing one or more corrective actions for the viewer to undertake to resolve the incident and permit the recording;
    storing the diagnostic descriptive in a history log, the history log accessible to the viewer through navigation of a television user interface program having an electronic program guide (EPG); and
    presenting the history log to enable viewing by the viewer responsive to input received via the television user interface program to present the history log.

13. The method as defined in claim 12, wherein the one or more corrective actions when undertaken permit the recording at the scheduled time.

14. The method as defined in claim 12, wherein the one or more corrective actions when undertaken permit the recording at a new time different than the scheduled time.

15. The method as defined in claim 12, wherein the incident comprises pre-emption of the broadcast program and detecting the incident comprises monitoring electronic program guide (EPG) data to determine that the broadcast program has been preempted.

16. The method as defined in claim 12, wherein:
    the incident comprises a conflict with another program event having a priority higher than a priority of the program event to record the broadcast program; and
    the one or more corrective actions include changing the priority of the program event to record the broadcast program.

17. The method as defined in claim 12, wherein:
    the incident comprises insufficient space in a memory to store the broadcast program when recorded; and
    the one or more corrective actions include deleting previously recorded programs from the memory.

* * * * *